United States Patent Office 2,862,908
Patented Dec. 2, 1958

2,862,908

POLYVINYL ACETALS

Wilford Donald Jones, Summit, Henry P. Marshall, New Providence, Richard E. Davies, Ridgewood, and Walter D. Paist, Berkeley Heights, N. J., assignors to Celanese Corporation of America, New York, N. Y., a corporation of Delaware No Drawing. Application December 15, 1954
Serial No. 475,560

12 Claims. (Cl. 260—45.95)

This invention relates to the production of polyvinyl acetals and relates more particularly to the production of polyvinyl acetals of light color and good stability.

As is well known in the art, polyvinyl acetals are produced by the reaction of aldehydes, such as formaldehyde, with polyvinyl alcohol or esters thereof, such as polyvinyl acetate or polyvinyl propionate, in the presence of acidic catalysts. According to one process which has been employed in the art, the polyvinyl acetals are produced by reacting polyvinyl acetate or other polyvinyl ester and formaldehyde, acetaldehyde or other lower aldehyde in solution in an aqueous lower fatty acid containing sulfuric acid. After the reaction has been completed the solution is neutralized. The polyvinyl acetal is then precipitated from the solution, as by the addition of water, and then washed. It has been found that polyvinyl acetals produced in this manner are not entirely suitable for use as molding materials since they exhibit a tendency to yellow and to become insoluble when molded or extruded at elevated temperatures. Furthermore, the polyvinyl acetals produced in this manner do not have the desired degree of purity.

It is therefore an object of this invention to provide a new economical and efficient process for the production of polyvinyl acetals which is free from the foregoing and other disadvantages.

A further object of this invention is the provision of a novel process for the economical production of polyvinyl formals of low ash content and low color-forming tendencies.

Still another object of this invention is to provide a new and efficient process for reacting formaldehyde and polyvinyl acetate in the presence of aqueous acetic acid and an acid catalyst to produce a polyvinyl formal and for subsequently treating said polyvinyl formal to obtain a product of very light color and low ash content.

Other objects of this invention will be apparent from the following detailed description and claims.

In accordance with one aspect of this invention an appreciably lighter colored polyvinyl acetal is obtained when the acetalization reaction is carried out in an atmosphere of an inert gas substantially free of oxygen. Inert gases which may be employed in the practice of this invention include nitrogen and carbon dioxide, advantageously containing not more than 0.1% by volume of oxygen. Thus, in one convenient procedure, a stream of purified nitrogen containing less than 0.002% by volume of oxygen is led, before and during the acetalization reaction, over the surface of a reaction mixture comprising polyvinyl acetate, formaldehyde, aqueous acetic acid and the acetalization catalyst. The inert gas is preferably maintained at a slight superatmospheric pressure as it passes over the reaction mixture in order to prevent the outside air from entering the system. Pressures of, for example, 0.1 pound per square inch gauge are satisfactory for this purpose. If desired, however, higher superatmospheric pressures, subatmospheric pressures or atmospheric pressure may be used, suitable apparatus being employed.

In accordance with another aspect of this invention, an appreciable improvement in the color of a polyvinyl formal resin produced by reaction of the formaldehyde and polyvinyl acetate in an aqueous lower fatty acid may be obtained by carrying out the formalization reaction in the presence of small amounts of sodium sulfoxylate formaldehyde. Conveniently, the sodium sulfoxylate formaldehyde is incorporated into the reaction mixture by adding sodium hydrosulfite ($Na_2S_2O_4$) to said mixture; the reaction of the formaldehyde with the sodium hydrosulfite producing sodium sulfoxylate formaldehyde. The formalization reaction in the presence of the sodium sulfoxylate formaldehyde may be carried out in air or in an atmosphere of nitrogen or other inert gas. The amount of sodium sulfoxylate formaldehyde desirably is in the range of 0.5% to 4% by weight, based on the weight of polyvinyl acetate.

In the process of this invention the concentration of the lower fatty acid in the aqueous reaction medium is such that the reaction mixture is homogeneous, i. e. the reactants as well as the polyvinyl acetal reaction product are soluble therein. Thus, aqueous acetic acid containing 50 to 90% by weight of acetic acid has been found to be a very suitable reaction medium. If desired, other lower saturated fatty acids, such as formic acid, may be used in place of, or in combination with, the acetic acid. The proportion of polyvinyl acetate dissolved in the reaction medium may be varied widely, e. g. from 10 to 40%, by weight, based on the weight of aqueous acetic acid.

With respect to the catalyst employed for effecting the formalization reaction, very good results have been obtained by the use of sulfuric acid, e. g. in amounts of 1% to 5% by weight, based on the weight of aqueous acetic acid. Perchloric acid is also a very good catalyst, since when this acid is used the content of bound acid residues of the resulting polyvinyl acetal is extremely small. This seems to be due to the fact that when the reaction is carried out in the aqueous lower fatty acid medium the chlorate ion of the perchloric acid is prevented from combining with the polymer molecules, being readily displaced therefrom by the acetate or other lower fatty acid ion. In addition, the rate of formalization when perchloric acid is used as the catalyst is much higher than when sulfuric acid is employed. Thus, a small amount of perchloric acid catalyzes the reaction at the same rate as a much larger amount of sulfuric acid.

Another acidic catalyst which may be employed in the practice of this invention is a strongly acidic cation-exchange resin, such as a cation-exchange resin containing a plurality of sulfonic acid groups. Examples of such resins are sulfonated cross-linked water-insoluble polymers such as sulfonated phenol-formaldehyde resins or sulfonated styrene-divinylbenzene copolymers. One suitable resin is sold under the name "Permutit Q," which may be activated to the acid form by treatment with sulfuric acid. The use of the cation-exchange resin as the catalyst permits ready and complete removal of the catalyst from the reaction mixture and avoids any contamination of the polyvinyl acetal by catalyst residues. The cation-exchange resin catalyst also lends itself readily to use in continuous processes. Thus, in one convenient process polyvinyl acetate, or other polyvinyl fatty acid ester, is dissolved in aqueous acetic acid, together with an excess of formaldehyde, and the resulting solution is blended with fine particles of the cation-exchange resin to form a slurry. This slurry is passed continuously through a heated reaction zone, which may be, for example, in the form of a long coiled pipe surrounded by a heating medium such as steam, the rate of flow of the slurry being adjusted so that its residence time in said reaction zone is sufficient to cause the reaction to take place to the desired extent. After the stream of slurry emerges from the reaction zone, the particles of cation-exchange resin are continuously separated from the rest of the reaction mixture, as by means of a centrifugal filter, and the separated particles are recycled by admixing them with fresh reactants and reaction medium. The cation-exchange resins maintain their activity in such a process for long periods of time so that little, if any, addition of fresh catalyst or regeneration of spent catalyst is required.

Some cation-exchange resins contain color bodies which may be extracted from the resin and thus color the resulting polyvinyl acetal during the process. In such cases the cation-exchange resin should be pretreated, as by extracting it with the most active solvent portion of the reaction medium, e. g. with hot acetic acid at or above the temperature of the acetalization reaction. Also, as the resin is recycled in the process the color bodies thereof are continuously extracted so that the tendency of the resin to color the product decreases.

In accordance with this invention the acetalization reaction is advantageously carried out to such an extent as to produce a polyvinyl acetal in which at least 75%, e. g. 80 or 83 to 86%, of the polymer units, i. e.

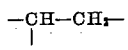

units, are attached to acetal groups, e. g. —O—CH$_2$—O— groups, and in which the proportion of polymer units attached to acetate or other ester groups is relatively low, e. g. less than 17%, preferably about 5%, the balance of the polymer units being attached to hydroxyl groups. At the preferred temperatures of the reaction, i. e. about 60 to 120° C., the reaction times are usually several hours, e. g. 8 to 24 hours. The amount of formaldehyde present, by weight, is advantageously 25% to 35% based on the weight of the polyvinyl acetate.

After the acetalization reaction has been carried out to the desired extent the polyvinyl acetal is recovered from the solution, as by precipitation with a non-solvent therefor, and washed. One convenient method of precipitation involves feeding a stream of the reaction mixture and a stream of water into a violently agitated precipitation zone to form fine particles of the polyvinyl acetal.

When the catalyst used is sulfuric acid, it is advantageous, before precipitation, to incorporate an alkali metal salt of a lower fatty acid into the reaction mixture and to heat the resulting mixture for a period of several hours, preferably at a temperature of about 60 to 130° C. for a period of 1 to 6 hours or more, while the polyvinyl acetal remains dissolved in said reaction mixture. The use of this procedure effects a considerable reduction in the combined sulfate content and color-forming tendencies of the polyvinyl acetal, in an efficient and economical manner. Suitable amounts of the alkali metal salt of the lower fatty acids are, for example, about 0.7 to 1.1 equivalents per equivalent of sulfuric acid. The alkali metal salt of the lower fatty acid may be incorporated into the reaction mixture in any convenient manner. Thus, sodium acetate, as such, may be added to the reaction mixture or the sodium acetate may be incorporated by the addition of sodium hydroxide to a reaction mixture containing acetic acid. Similarly, when the reaction medium is aqueous formic acid, it is most convenient to incorporate an alkali metal formate rather than the sodium, or other alkali metal, acetate into the reaction mixture. In place of, or in addition to, the alkali metal salt of the lower fatty acid, the alkali metal (e. g. sodium or potassium) thiocyanates, thiosulfates and thiophosphates may be employed. It is advantageous to carry out the heating of the solution containing the alkali metal salt while the solution is in an inert atmosphere.

After the precipitation and washing, the polyvinyl acetal is dried in air or in vacuo. An antioxidant should be added to the poyvinyl acetal before drying, particularly when the drying is carried out in air, in order to prevent development of color in the product. Especially good results are obtained by the use as the antioxidant of 2,6-dialkyl phenols and 2,4,6-trialkyl phenols, preferably having tertiary alkyl groups, e. g. tertiary butyl or tertiary amyl groups, in the 2 and 6 positions, for example, 2,6-di-t-butyl-p-cresol. It has been suggested in the art that p-t-amyl phenol be employed as an antioxidant in the drying operation. However, it has been found in the practice of this invention that the use of p-t-amyl phenol leads to much greater color formation than the aforementioned 2,6- and 2,4,6-dialkyl phenols. For example, when two otherwise identical portions of a polyvinyl formal resin, one containing ½% of p-t-amyl phenol and the other containing ½% of 2,6-di-t-butyl-p-cresol are dried in air at 60° C. for 96 hours and then molded at 240° C. into chips 0.060 inch thick, the chip containing p-t-amyl phenol shows a yellowness coefficient of 0.995 while the other chip shows a yellowness coefficient of only 0.46.

The following examples are given to illustrate the invention further.

*Example 1*

20 parts by weight of the polyvinyl acetate sold under the name "Gelva V7" are dissolved in 65 parts by weight of glacial acetic acid, 6.94 parts by weight of formaldehyde (in the form of formalin of 37% by weight concentration) and 0.38 parts by weight of sodium hydrosulfite are added to the resulting solution, following which the mixture is heated to 70° C. while it is maintained under a stream of purified nitrogen containing less than 0.002% by volume of oxygen. Thereafter there are added 3.0 parts by weight of concentrated (97%) sulfuric acid and an amount of water sufficient to provide a total of 35.0 parts of water in the resulting mixture, and the mixture is agitated at a temperature of 70° C. under a stream of said purified nitrogen for 24 hours. Thereafter, the sulfuric acid catalyst is neutralized by the addition of 3.6 parts by weight of anhydrous sodium acetate and the resulting mixture is heated at 95° C. for 6 hours with agitation under an atmosphere of said purified nitrogen. Then the polyvinyl formal is precipitated from the solution in the form of fine particles by continuously mixing a stream of the solution with a stream of deionized water. The precipitated polyvinyl formal is filtered, soaked in deionized water overnight, again filtered and thereafter mixed with 10 times its weight of a dilute aqueous sodium hydroxide solution having a pH of 11.2 and containing 40% by weight of methanol. This mixture is heated for 2 hours at reflux temperature and atmospheric pressure, following which the polyvinyl formal is separated by filtration, washed twice more with water and then slurried in 10 times its weight of deionized water. To the resulting slurry there is added 0.5% by weight, based on the weight of the polyvinyl formal, of di-tertiary butyl p-cresol, in the form of a 5% solution thereof in ethanol while the slurry is stirred for 20 minutes. Thereafter the slurry is filtered and dried in an air oven at 60° C. for 24 hours. Analysis of the product shows that 10.5% of the polymer units are attached to hydroxyl groups, 5.2% to acetate groups and 84.3% to formal radicals (i. e. the degree of formalization is 84.3%), the ash content is 0.08%, the total sulfate content is 0.116% and the soluble sulfate content is 0.048%, the bound or combined sulfate content being therefore 0.068. The product is molded in a Carver press for 15 minutes at 240° C. into a disk 0.060 inch in thickness. This disk transmits 85.9% of the incident light having a wavelength of 640 mμ, and its yellowness coefficient is 0.12%. The yellowness coefficient is defined by the formula $$Cy = 1 - \frac{\%\ \text{light transmission at 440 m}\mu}{\%\ \text{light transmission at 640 m}\mu}$$

Example II

Example I is repeated except that the sulfuric acid is replaced by an equal weight of perchloric acid. The polyvinyl formal is of good color and low ash content; 85.9% of its polymer units are attached to formal radicals, 8.7% to hydroxyl groups, and 5.4% to acetate radicals.

Example III

A mixture of 88.9 parts by weight of glacial acetic acid, 11.1 parts by weight of water, 19.8 parts by weight of the polyvinyl acetate known as "Gelva V15," 8.85 parts by weight of formaldehyde and 4.05 parts by weight of perchloric acid is heated at 70° C. with agitation for 24 hours, then neutralized with ammonia water at 70° C., and thereafter precipitated in water with agitation. The precipitated polyvinyl formal is separated from the mother liquor, slurried in deionized water, filtered, slurried in dilute aqueous sodium hydroxide solution having a pH of 9 and then washed for one hour in a stream of tap water. On molding into a disk 0.060 inch in thickness at 240° C. for 15 minutes the product turns light yellow in color. Its ash content is only 0.02% and its degree of formalization is 87.3%.

Example IV

The spherical granular cation-exchange resin containing sulfonic acid groups having a particle size of 1 to 2 mm. and known as "Permutit Q" is activated to its acidic form by stirring it with a large excess of aqueous 5% sulfuric acid for 1 hour followed by washing with deionized water until the inflowing water and outflowing wash water have the same pH. A mixture containing 200 parts by weight of the activated resin (weight calculated on a dry basis), 500 parts by weight of the polyvinyl acetate known as "Gelva V15," 1625 parts by weight of glacial acetic acid, 189 parts by weight of formaldehyde, 9.4 parts by weight of sodium hydrosulfite and 760 parts by weight of water are agitated for 24 hours at 100° C. The resin is separated from the liquid by centrifugation and reused, and the polyvinyl formal is precipitated from the liquid reaction mixture and washed.

Example V

A mixture of 20 parts by weight of polyvinyl acetate, 67 parts by weight of glacial acetic acid, 33 parts by weight of water, 6.6 parts by weight of formaldehyde, 2 parts by weight of perchloric acid and 0.38 parts by weight of sodium hydrosulfite are heated in an atmosphere of purified nitrogen to a temperature of 100° C., while agitating, for 5 hours. The reaction mixture is then neutralized with aqueous sodium hydroxide and sodium acetate and the polyvinyl formal is precipitated by the addition of water. The polyvinyl formal is then washed with water, stabilized by treatment wtih aqueous sodium hydroxide, and mixed with di-t-butyl-p-cresol. The degree of formalization of the product is 85.5%.

Example VI

Example I is repeated except that instead of heating the neutralized reaction mixture for 6 hours at 95° C. it is heated for 1 hour at 90° C. and then at 120 to 130° C. for 4 hours under an atmosphere of nitrogen, containing less than 0.002% by volume of oxygen, under pressure. Further treatment is the same as in Example I. The bound or combined sulfate content of the product is only 0.01%.

It is to be understood that the foregoing detailed description is merely given by way of illustration and that many variations may be made therein without departing from the spirit of our invention.

Having described our invention, what we desire to secure by Letters Patent is:

1. In the process for the production of polyvinyl formal which comprises reacting polyvinyl acetate and formaldehyde in solution in aqueous acetic acid containing an acid catalyst for said reaction, the improvement which comprises carrying out the reaction in the presence of 0.5 to 4%, based on the polyvinyl acetate, of sodium sulfoxylate formaldehyde.

2. Process as set forth in claim 1 in which the acid catalyst is sulfuric acid.

3. Process as set forth in claim 1 in which the acid catalyst is perchloric acid.

4. Process as set forth in claim 1 in which the acid catalyst is a cation-exchange resin containing sulfonic acid groups.

5. Process as set forth in claim 1 in which the reaction is carried out in an inert atmosphere of nitrogen containing less than 0.1% of oxygen.

6. Process as set forth in claim 1 in which the acid catalyst is sulfuric acid and, after a dissolved polyvinyl formal having a degree of formalization of at least about 75% is produced, sodium acetate is incorporated into said solution and the solution is heated for a period of at least about 1 hour at a temperature of at least about 60° C. to reduce the combined sulfate content of said polyvinyl formal and then the polyvinyl formal is precipitated from said solution by the addition of a non-solvent therefor.

7. In the process of preparing polyvinyl acetals by the reaction of a polyvinyl ester with a lower aldehyde at an elevated temperature while the reactants and products are dissolved in an aqueous saturated lower fatty acid in the presence of sulfuric acid as a catalyst for said reaction, the improvement which comprises incorporating into the solution containing the polyvinyl acetal produced by said reaction an alkali metal salt of an acid selected from the group consisting of lower fatty acids, thiocyanic acid, thiosulfuric acid and thiophosphoric acid and heating the resulting solution for a period of at least about 1 hour to a temperature of at least about 60° C. to reduce the combined sulfate content of said polyvinyl acetal.

8. Process as set forth in claim 7 in which the aldehyde is formaldehyde, the solvent is aqueous acetic acid and the alkali metal salt is sodium acetate.

9. Process which comprises reacting polyvinyl acetate and formaldehyde while dissolved in aqueous acetic acid in the presence of sulfuric acid and sodium sulfoxylate formaldehyde and in an inert atmosphere of nitrogen containing less than 0.1% of oxygen to obtain a solution in aqueous acetic acid of a polyvinyl formal having a degree of formalization of at least about 75%, adding sodium acetate, in about the amount necessary to neutralize said sulfuric acid, to said solution, and heating said solution at a temperature of 60 to 130° C. for a period of at least 1 hour to reduce the combined sulfate content of said polyvinyl formal, precipitating said polyvinyl formal by the addition of water to said solution, washing said precipitated polymer and drying said precipitated polyvinyl formal at an elevated temperature in the presence of 2,6-di-t-butyl-p-cresol.

10. Process for the drying of resins, which comprises adding a stabilizing amount of a 4-methyl, 2,6-tertiary alkyl phenol, the tertiary alkyl being selected from the class consisting of tertiary amyl and tertiary butyl, to a slurry of fine particles of a polyvinyl acetal resin in an aqueous medium and heating the mixture to evaporate the water therefrom.

11. A polyvinyl acetal containing as a stabilizer therefor a stabilizing amount of a 4-methyl, 2,6-tertiary alkyl phenol, the tertiary alkyl being selected from the class consisting of tertiary amyl and tertiary butyl.

12. A composition as set forth in claim 11 in which the stabilizer is 2,6-di-t-butyl-p-cresol.

References Cited in the file of this patent

UNITED STATES PATENTS

| | | |
|---|---|---|
| 2,195,122 | Norlander | Mar. 26, 1940 |
| 2,272,828 | Berg | Feb. 10, 1942 |
| 2,662,061 | Gilcrease et al. | Dec. 8, 1953 |

FOREIGN PATENTS

| | | |
|---|---|---|
| 407,404 | Italy | Oct. 5, 1944 |